A. W. McKOWN.
WAGON-SPRING.
No. 171,401. Patented Dec. 21, 1875.
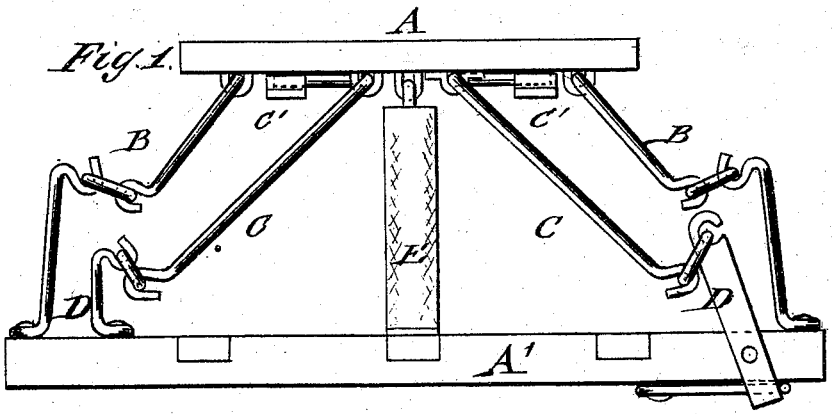
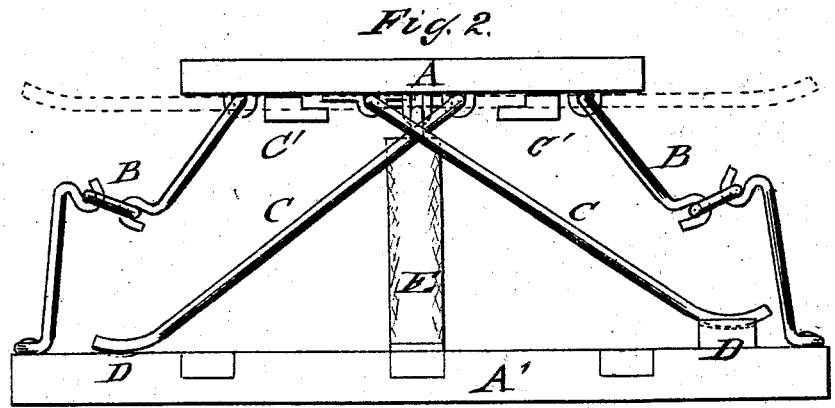
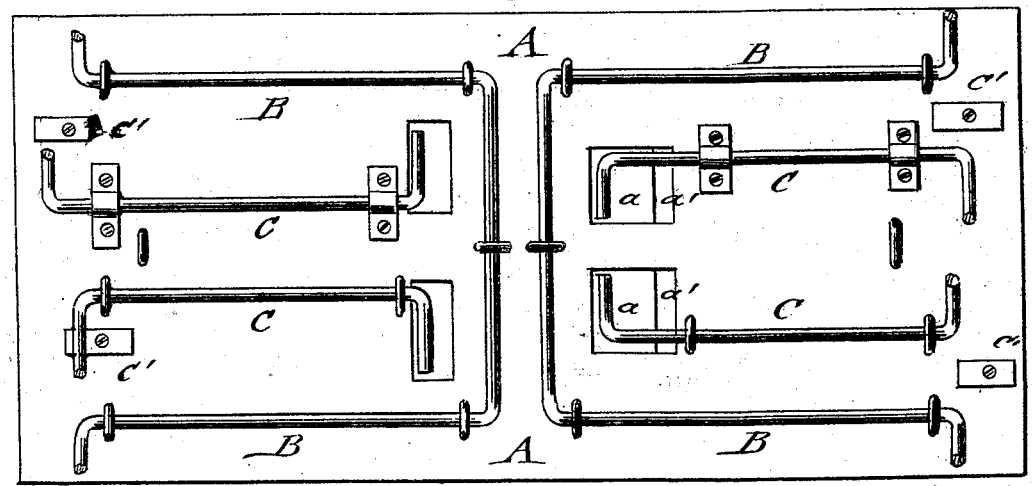

UNITED STATES PATENT OFFICE.

ALEXANDER W. McKOWN, OF HONESDALE, PENNSYLVANIA.

IMPROVEMENT IN WAGON-SPRINGS.

Specification forming part of Letters Patent No. 171,401, dated December 21, 1875; application filed September 4, 1875.

*To all whom it may concern:*

Be it known that I, ALEXANDER W. MC-KOWN, of Honesdale, in the county of Wayne and State of Pennsylvania, have invented a new and useful Improvement in Wagon-Springs, of which the following is a specification:

In the accompanying drawing, Figures 1 and 2 represent end views of my improved wagon-spring; and Fig. 3, a bottom view of the wagon-body, showing attachment of springs thereto.

Similar letters of reference indicate corresponding parts.

The object of this invention is to combine, with main supporting-springs for vehicles, auxiliary or re-enforcing springs, which may be applied to assist or re-enforce torsional springs, for carrying any extra load that may be put upon them above their sustaining capacity, and to disconnect the auxiliary springs and throw them out of action when the load is smaller than the carrying capacity of the main springs, so that in each case a more effective and elastic action of the springs is obtained.

The invention consists in the combination of torsion-springs of a vehicle with auxiliary or re-enforcing torsion-springs, arranged under the wagon-body, and acted upon by a lever-connection with the axle, bolster, or other supports, to be thrown in or out of action according to the weight of the load to be carried. The lever of the auxiliary springs is to be swung up, and secured, by any suitable fastening device, to the wagon-body when not in use.

In the drawing, A represents the body of a vehicle, and A' the axles of the same, to which the main springs B are applied in some approved manner. Additional torsional springs C are attached, by suitable staples, to the wagon-body and to standards, blocks, or other seats D of the axles. The auxiliary springs C serve to re-enforce the main springs B, and may be detached from standards or seats D, and the lever ends swung up to the under side of the wagon-body, to be there secured by suitable fastening devices C'.

The auxiliary springs C may be arranged either as shown in Fig. 1, extending from the center to the sides; or they may be made to cross each other, as in Fig. 2, the springs passing in both cases sidewise of each other when thrown up, and secured to the bottom of the wagon-body.

When the lever ends of the auxiliary springs cross each other, as in Fig. 2, their rear ends are seated in recesses $a$ of the body A, and have to be moved forward to deeper grooves $a'$, to allow the swinging up of the front or lever ends. The supporting main and auxiliary springs are arranged according to the weight of the load to be carried.

When the load does not exceed the carrying capacity of the main spring the auxiliary springs are thrown out of action, as they would impart a too stiff and rigid action and short and jerky movements to the body; but when the weight of the load exceeds the capacity of the main springs the auxiliary springs are brought into use, and thereby the same proportionate resistance given to the load as in the former case, while the adjustment of spring-power produces in each case the easier and more elastic support of the body. The power of the springs is more fully utilized and their durability increased by the uniformity of strain to which they are exposed by my adjustable arrangement.

Check-straps E connect, furthermore, the wagon-body and perch, and are hitched and unhitched for the arrangement of the auxiliary springs. They are designed to steady and control the action of the springs, and are, under some conditions, of great usefulness.

Having thus described my invention, I claim as new and desire to secure by Letters Patent—

The detachable torsion-springs C, arranged on the inside of outer springs B, as and for the purpose described.

ALEXANDER W. McKOWN.

Witnesses:
 P. P. SMITH,
 JAS. B. ELDRED.